US011981137B2

(12) United States Patent
Shibata

(10) Patent No.: US 11,981,137 B2
(45) Date of Patent: May 14, 2024

(54) METHOD FOR PRODUCING LIQUID-EJECTION HEAD SUBSTRATE

(71) Applicant: CANON KABUSHIKI KAISHA, Tokyo (JP)

(72) Inventor: Kazuaki Shibata, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 247 days.

(21) Appl. No.: 17/696,147

(22) Filed: Mar. 16, 2022

(65) Prior Publication Data

US 2022/0297432 A1 Sep. 22, 2022

(30) Foreign Application Priority Data

Mar. 22, 2021 (JP) ................................ 2021-047215

(51) Int. Cl.
*B41J 2/16* (2006.01)

(52) U.S. Cl.
CPC ............. *B41J 2/1628* (2013.01); *B41J 2/164* (2013.01)

(58) Field of Classification Search
None
See application file for complete search history.

(56) References Cited

U.S. PATENT DOCUMENTS

| | | | | |
|---|---|---|---|---|
| 6,293,654 B1 * | 9/2001 | Pidwerbecki | B41J 2/14201 | 347/64 |
| 2008/0313900 A1 * | 12/2008 | Kwon | B41J 2/1631 | 29/890.1 |
| 2010/0053272 A1 * | 3/2010 | Shim | B41J 2/14145 | 347/47 |
| 2010/0123759 A1 * | 5/2010 | Matsui | B41J 2/1603 | 347/63 |
| 2011/0018939 A1 * | 1/2011 | McAvoy | B41J 2/1626 | 347/50 |
| 2011/0141197 A1 * | 6/2011 | Komiyama | B41J 2/1629 | 257/E21.085 |
| 2013/0141494 A1 * | 6/2013 | Ishida | B41J 2/14427 | 347/64 |
| 2013/0286105 A1 * | 10/2013 | Bengali | B41J 2/1603 | 347/62 |
| 2016/0114584 A1 * | 4/2016 | Abbot, Jr. | B41J 2/1642 | 347/62 |

FOREIGN PATENT DOCUMENTS

JP 2012101557 A 5/2012

* cited by examiner

*Primary Examiner* — Shamim Ahmed
(74) *Attorney, Agent, or Firm* — CANON U.S.A., INC. IP Division

(57) ABSTRACT

A method for producing a liquid-ejection head substrate includes forming a protective film covering the surface of a portion of a cavitation resistant film provided at a position where the heating resistor is covered with a metallic material containing at least one of titanium, tungsten, and titanium tungsten and etching the substrate after forming the protective film.

13 Claims, 5 Drawing Sheets

METHOD FOR PRODUCING LIQUID-EJECTION HEAD SUBSTRATE

BACKGROUND OF THE INVENTION

Field of the Invention

The present disclosure relates to a method for producing a liquid-ejection head substrate for use in a liquid ejection head that ejects liquid.

Description of the Related Art

The microfabricated structure of a semiconductor substrate is widely used in functional devices of a micro electromechanical system (MEMS) and electromechanical fields. One example is a liquid ejection head that performs printing by ejecting liquid droplets onto print media. Thermal liquid ejection heads perform printing by causing film boiling of liquid, such as ink, using thermal energy generated by supplying power to a heating resistor and by ejecting the liquid through ejection ports using pressure caused by the film-boiling.

These liquid ejection heads include a liquid-ejection head substrate, which is a semiconductor substrate including heating resistors, and a channel member in which ejection ports and channels are formed. The heating resistors are driven by an electrical signal and a voltage supplied from a liquid ejection apparatus main body including the liquid ejection head via electrode pads provided on the liquid-ejection head substrate.

Each heating resistor is coated with an insulating protection layer having electrical insulating properties. A thermic effect unit, which is an ink contact portion above the heating resistor, is exposed to high temperature by the heat generated from the heating resistor and is subjected to multiple actions including a physical action, such as an impact due to cavitation caused by foaming and shrinkage of the ink and a chemical action of the ink. To protect the heating resistor from these influences, a cavitation resistant film is provided on a portion of the insulating protection layer covering the heating resistor, and a portion of the cavitation resistant film above the heating resistor functions as a thermic effect unit. Thus, the liquid-ejection head substrate extends the life of the head and improves the reliability by providing the cavitation resistant film. The cavitation resistant film is generally made of a metallic material, such as tantalum or niobium. Japanese Patent Laid-Open No. 2012-101557 discloses a configuration for extending the life of the head by uniformly removing a burnt deposit on the surface of the thermic effect unit, in which the cavitation resistant film is made of a metallic material, such as iridium or ruthenium.

The electrode pads provided on the liquid-ejection head substrate have a structure in which multiple kinds of metal film, such as an electrode layer provided on the wiring lines and a diffusion prevention layer for preventing the metal of the electrode layer from diffusing to the substrate, are laminated. In forming the electrode pads, an oxide layer and organic pollutants formed on the surface of the wiring lines are removed to provide sufficient electrical conductivity. Next, the formed metal films are patterned to a desired shape to form the electrode pads. The metal films are generally continuously formed by sputter etching (reverse sputtering) in vacuum using a sputter system to remove the oxide film and organic pollutants.

In forming the channel member on the liquid-ejection head substrate, the altered substances, such as an oxide film and organic pollutants, on the surface of the substrate need to be removed to provide sufficient adhesion between the substate and the channel member. These oxide film and organic pollutants are removed by a dry etching or wet etching method.

Since the above etching method is performed over the entire substrate, the cavitation resistant film serving as a thermic effect unit is also etched to decrease in thickness. The decrease in the thickness of the cavitation resistant film can decrease the life of the head.

In particular, if the cavitation resistant film is made of iridium, the decrease of iridium due to sputter etching is more than five times that of tantalum or niobium. This may increase variations in the thickness of the cavitation resistant film in the wafer surface or the chip. For this reason, particular attention should be paid to the thickness of the cavitation resistant film.

If the thickness of the cavitation resistant film is increased in consideration of a decrease in the thickness of the cavitation resistant film, consumption of raw materials for the cavitation resistant film is increased, leading to increased production cost.

SUMMARY OF THE INVENTION

Accordingly, an embodiment of the present disclosure reduces or eliminates a decrease in the thickness of the cavitation resistant film of a liquid-ejection head substrate.

A method for producing a liquid-ejection head substrate according to an aspect of the present disclosure includes preparing a substrate including a heating resistor and a cavitation resistant film including a portion provided at a position where the heating resistor is covered, a surface of the portion being exposed to an outside, forming a protective film covering the surface of the portion of the cavitation resistant film with a metallic material containing at least one of titanium, tungsten, and titanium tungsten, etching the substrate after forming the protective film, and removing the protective film after etching the etching.

Further features of the present disclosure will become apparent from the following description of exemplary embodiments with reference to the attached drawings.

DESCRIPTION OF THE EMBODIMENTS

Methods for producing liquid ejection head substrates according to embodiments of the present disclosure will be described with reference to the drawings. Although the embodiments illustrate specific examples of the present disclosure, these are technically preferable examples and do not limit the scope of the present disclosure.

First Embodiment

Figure 1A:
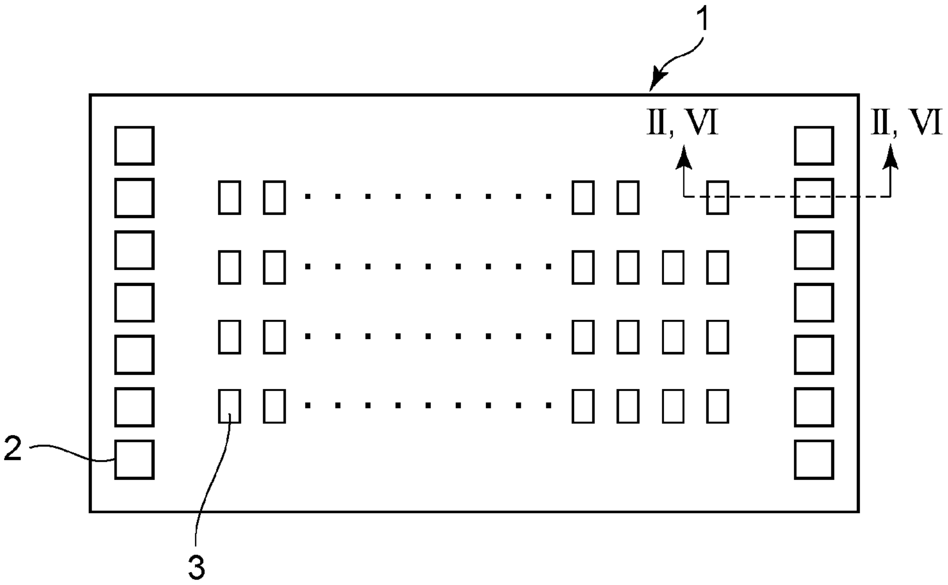
FIG. 1A is a schematic plan view of a liquid-ejection head substrate according to an embodiment to which the present disclosure can be applied.
Figure 1B:
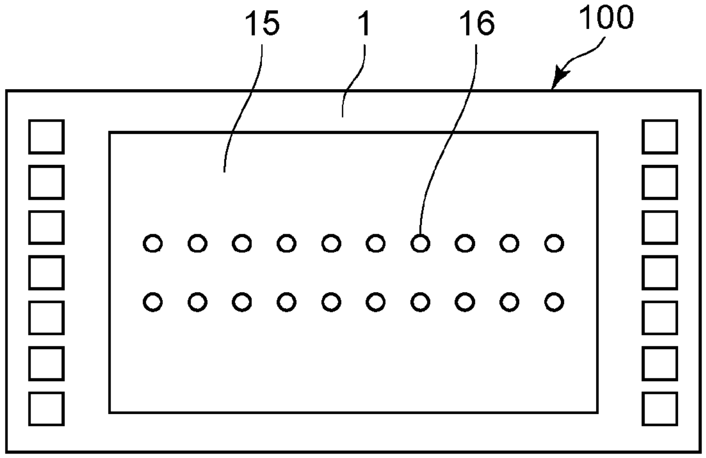
FIG. 1B is a schematic plan view of a liquid ejection head to which this embodiment can be applied.

FIG. 1A is a schematic plan view of a liquid-ejection head substrate 1 according to an embodiment to which the present disclosure can be applied. FIG. 1B is a schematic plan view of a liquid ejection head 100 to which this embodiment can be applied. The liquid-ejection head substrate 1 includes a plurality of electrode pads 2 and a plurality of thermic effect units 3. The liquid ejection head 100 includes the liquid-ejection head substrate 1 and a channel member 15 which is provided on the surface of the liquid-ejection head substrate 1 adjacent to the thermic effect units 3 and in which ejection ports 16 and channels are to be formed.

FIGS. 2A to 2E are schematic diagrams illustrating a method for producing the liquid-ejection head substrate 1 of this embodiment. FIGS. 2A to 2E are schematic diagrams illustrating, in particular, how the electrode pads 2 and the thermic effect units 3 are formed in a II-II cross-section of FIG. 1A. In this specification, the liquid ejecting direction is defined as upward, and the opposite direction is defined as downward, but this is defined only for convenience.

Figure 2A:
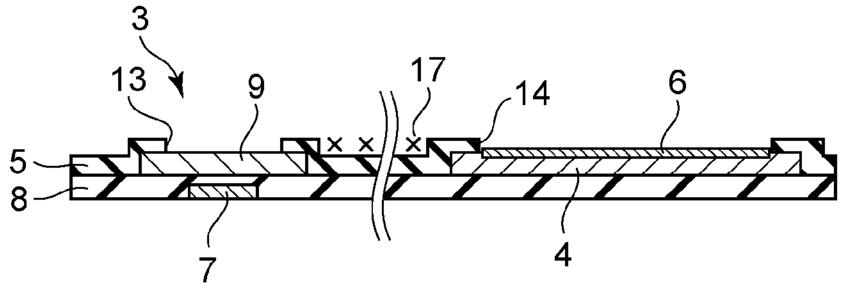
FIGS. 2A to 2E are schematic diagrams illustrating a method for producing a liquid-ejection head substrate according to a first embodiment.

As shown in FIG. 2A, first, a substrate serving as a first metal film constituting part of the electrode pads 2, in which the wiring lines 4 and the thermic effect units 3 are provided, is prepared. Referring to FIG. 2A, the cross-sectional configuration of the part constituting the electrode pads 2 will be described. An insulating protection layer 5 with electrical insulating properties is provided on the wiring lines 4 provided on an interlaminar film 8 on a base substrate (not shown). The insulating protection layer 5 has openings 14. The wiring lines 4 are generally made of metal with low specific resistivity, such as aluminum or copper. The insulating protection layer 5 is made of a silicon compound, such as silicon carbonitride film or silicon acid carbonitride film. Part of the wiring lines 4 is exposed from the openings 14 of the insulating protection layer 5, and the surface of the exposed part of the wiring lines 4 made of the above metal is covered with an oxide film 6. The oxide film 6 is removed by a later process.

Next, the cross-sectional configuration of the thermic effect units 3 will be described. The interlaminar film 8 with electrical insulating properties is provided on heating resistors 7 on the base substrate. Cavitation resistant films 9 are provided on the interlaminar film 8. The cavitation resistant films 9 protects the heating resistors 7 from the influence of a physical action, such as an impact due to cavitation caused by foaming and shrinking of liquid, such as ink, and chemical actions due to ink. The cavitation resistant films 9 are made of tantalum, niobium, iridium, or ruthenium which is resistant to a mechanical impact. Each cavitation resistant film 9 may be a lamination of these metallic materials. In this embodiment, the insulating protection layer 5 is provided also on the cavitation resistant film 9. To form the thermic effect unit 3, the insulating protection layer 5 has openings 13 from which the surface of the cavitation resistant film 9 is exposed to the outside.

Most of the surface of the liquid-ejection head substrate 1, other than the electrode pads 2 and the thermic effect units 3, is covered with the insulating protection layer 5, and at last part of the surface is stained with an oxide film and altered substances 17, such as organic pollutants. The presence of the altered substances 17 causes the channel member 15, which is formed on the surface of the liquid-ejection head substrate 1 later, to peel off. For this reason, the altered substances 17 are removed in a later process.

Figure 2B:
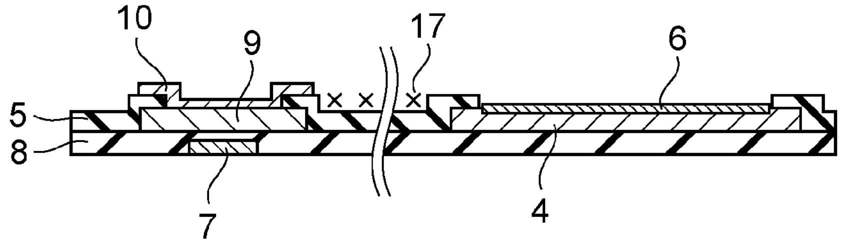
Figure 3:
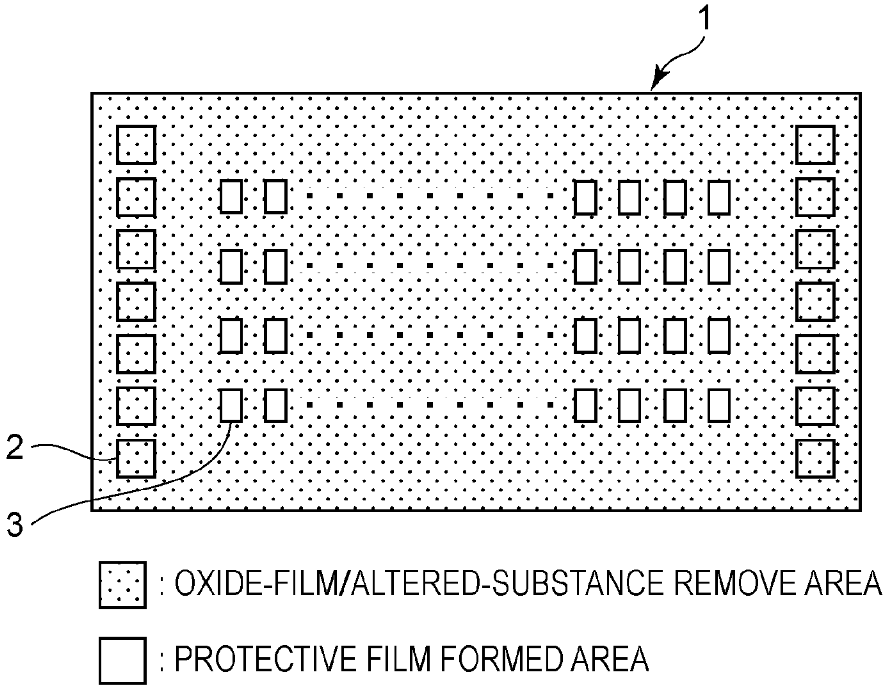
FIG. 3 is a schematic plan view of the liquid-ejection head substrate, illustrating areas of a protective film and an area in which an oxide film and altered substances are to be removed.

Referring next to FIG. 2B, a protective film 10 is formed so as to cover the top of the cavitation resistant film 9 of each thermic effect unit 3. FIG. 3 is a schematic plan view of the substrate on which the protective film 10 is formed, illustrating areas with the protective film 10, an area without the protective film 10, that is, an area in which the oxide film 6 and the altered substances 17 are to be removed. The protective film 10 is disposed on at least areas that cover the surfaces of the cavitation resistant films 9 serving as the thermic effect units 3.

The protective film 10 has a role in preventing a decrease in the thickness of the cavitation resistant film 9 due to sputter etching (reverse sputtering) described later. If the thickness of the protective film 10 is increased, film that is scraped and scattered by sputter etching can adhere to the side wall of the protective film 10 to form a fence. The fence adhering to the side wall of the protective film 10 can remain on the substrate even after the protective film 10 is removed and is separated in a later process into particles. For this reason, the thickness of the protective film 10 is preferably 60 nm or less. The lower limit of the thickness of the protective film 10 is preferably 20 nm in consideration of the performance of coating the cavitation resistant film 9 and the decrease in the thickness due to the sputter etching.

A material for the protective film 10 may be a metallic material, in particular, a metallic material containing at least, titanium, tungsten, and titanium tungsten in the following point of view. In other words, these metallic materials are highly resistant to sputter etching and can therefore sufficiently reduce a decrease in the thickness of the cavitation resistant film 9. These metallic materials have a high level of adhesion to the cavitation resistant film 9 made of tantalum, niobium, iridium, or ruthenium and the insulating protection layer 5 made of a silicon compound. This allows for reducing or eliminating peeling of the protective film 10 after the sputter etching process. Other materials for the protective film 10 include an organic material and an inorganic material. However, the organic material has lower sputter etching resistance than that of the metallic materials described above and may not be able to sufficiently reduce the decrease in the thickness of the cavitation resistant film 9 compared with the above metallic materials. The inorganic material has lower adhesion to the cavitation resistant film 9 than that of the above metallic materials and may cause peeling of the inorganic material from the protective film 10 after the sputter etching process. Accordingly, the metallic materials may be used for the protective film 10.

Figure 2C:
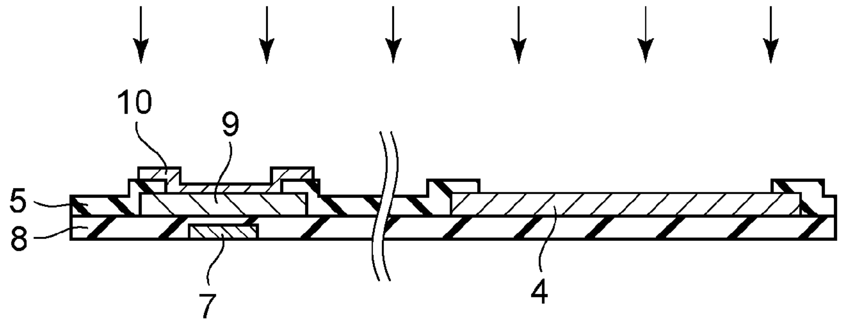

Referring next to FIG. 2C, the substrate is set at a deposition system and is subjected to sputter etching (reverse sputtering) with inert-gas plasma, such as argon, to remove the oxide films 6 on the surfaces of the wiring lines 4. The removal of the oxide films 6 provides sufficient electrical conductivity to the electrode pads 2.

The reverse sputtering process removes the altered substances 17 (altered layers and organic pollutants) on the surface of the insulating protection layer 5. This exposes a clear surface of the substrate to provide high adhesion to the channel member provided in a later process.

The protective film 10 formed on the top of the cavitation resistant film 9 prevents a decrease in the thickness of the cavitation resistant film 9 due to the reverse sputtering process. This can extend the life of the liquid ejection head 100.

Figure 2D:
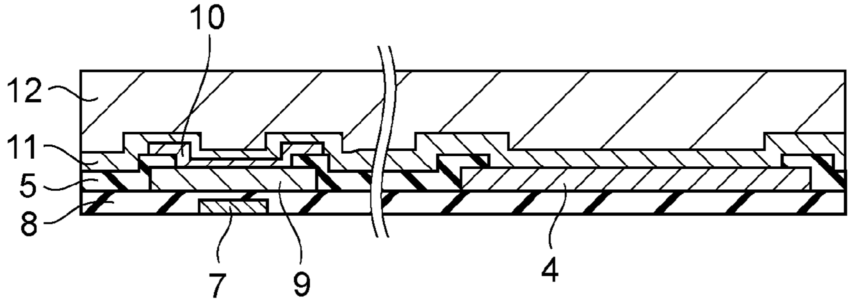

Referring next to FIG. 2D, a diffusion prevention layer 11, which is an intermediate metallic film, and an electrode layer 12, which is a second metallic film, are formed on the entire surface of the substrate with the deposition system next to the reverse sputtering process. The diffusion prevention layer 11 is made of a metallic material with high adhesion to the wiring line 4 and the electrode layer 12, with stability to temperature to cause no diffusion, and with low specific resistivity or a compound thereof. In this embodiment, examples of the metallic material include titanium tungsten and tungsten. The electrode layer 12 is made of a metallic material with low specific resistivity and high corrosion resistance. In this embodiment, the electrode layer 12 is made of gold.

Figure 2E:
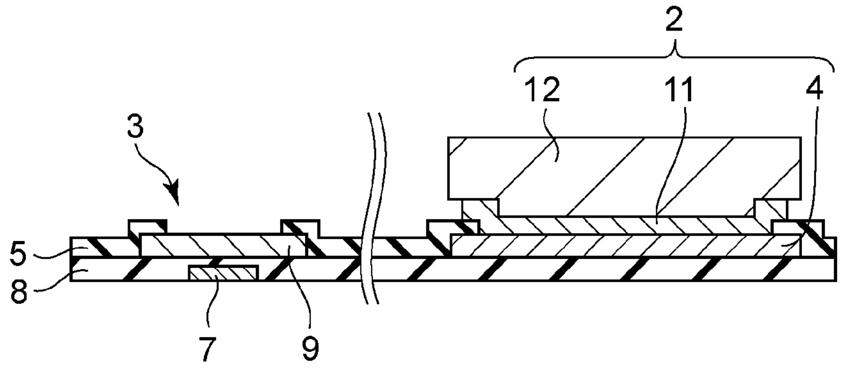

Referring next to FIG. 2E, the electrode layer 12 and the diffusion prevention layer 11 are patterned using a photolithography method to form the electrode pads 2. In this embodiment, each electrode pad 2 is a lamination of the wiring line 4, the diffusion prevention layer 11, and the electrode layer 12.

Unnecessary part of the electrode layer 12 and the diffusion prevention layer 11 are etched by wet etching.

Forming the diffusion prevention layer 11 and the protective film 10 with the same material allows removing the diffusion prevention layer 11 and the protective film 10 using the same etching process, which may reduce the processing load. The electrode layer 12 made of gold can be etched using an etchant containing iodine and potassium iodide. The diffusion prevention layer 11 and the protective film 10 made of titanium tungsten or the like can be etched using a 30% hydrogen peroxide solution. Employing wet etching with a hydrogen peroxide solution for etching the protective film 10 provides sufficient options for the cavitation resistant film 9, allowing for preventing a decrease in the thickness of the cavitation resistant film 9 in etching the protective film 10.

Figure 4:
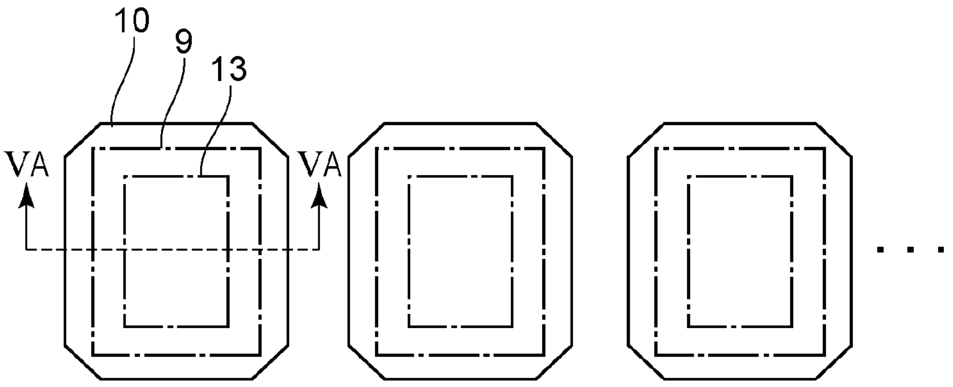
FIG. 4 is a schematic enlarged plan view of thermic effect units in each of which the protective film is formed.
Figure 5A:
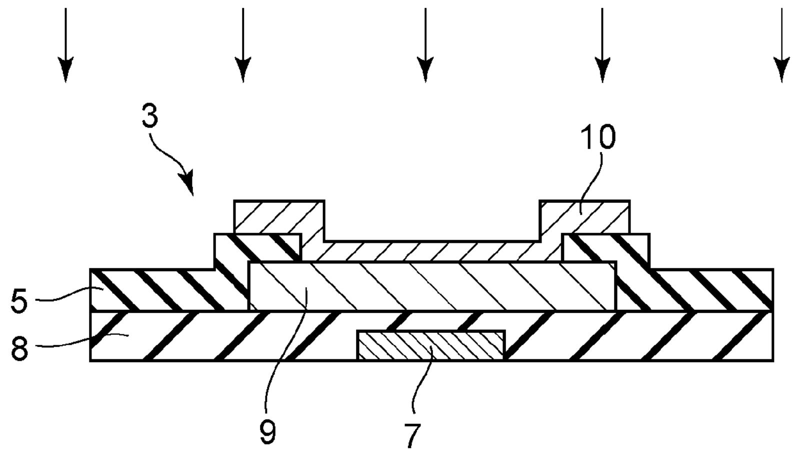
FIG. 5A is a diagram illustrating the state of the thermic effect unit before a reverse sputtering process.
Figure 5B:
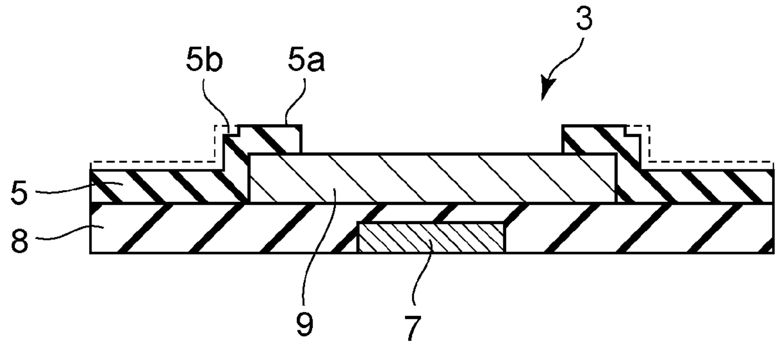
FIG. 5B is a diagram illustrating the state of the thermic effect unit after the reverse sputtering process.

FIG. 4 is a schematic plan view of the protective films 10 formed in the thermic effect units 3. FIGS. 5A and 5B are detailed drawings of the thermic effect unit 3 before and after the reverse sputtering process, respectively. FIG. 5A is a cross-sectional view taken along line VA-VA of FIG. 4, illustrating the state of the substrate before the reverse sputtering process.

FIG. 5B is a diagram illustrating a state in which the protective film 10 is removed after the reverse sputtering process.

The liquid-ejection head substrate 1 includes the plurality of heating resistors 7. In this embodiment, the cavitation resistant films 9 are provided so as to cover the individual heating resistors 7, as shown in FIG. 4. The insulating protection layer 5 covering the cavitation resistant films 9 has openings 13 in correspondence with the cavitation resistant films 9 in such a manner that the outer rims of the openings 13 are positioned inside the outer rims of the cavitation resistant films 9. The liquid-ejection head substrate 1 are provided with the plurality of thermic effect units 3 in this manner. The protective films 10 may be disposed in independent patterns so as to cover the individual thermic effect units 3. This is because providing the protective films 10 only at necessary portions allows for reliably removing altered layers in the insulating protection layer 5 and organic pollutants due to the reverse sputtering process.

As shown in FIG. 5B, the insulating protection layer 5 in the area where the protective film 10 is not disposed is reduced in thickness by more than 10 nm because of the reverse sputtering process, and the cavitation resistant film 9 and the insulating protection layer 5 in the area where the protective film 10 is disposed is not reduced in the thickness. This causes a level difference of more than 10 nm between a surface 5*a* of the insulating protection layer 5 where the protective film 10 is disposed and a surface 5*b* of the insulating protection layer 5 where the protective film 10 is not disposed. FIG. 5B illustrates the decreased portions of the insulating protection layer 5 with broken lines. If the protective films 10 are thin and the level difference due to the decrease in the thickness of the insulating protection layer 5 is minute, generation of fences at the portions where the protective films 10 were present before being removed can be prevented.

Second Embodiment

FIGS. 6A to 6E are schematic diagrams illustrating a method for producing a liquid-ejection head substrate 1 of this embodiment. FIGS. 6A to 6E are schematic diagrams illustrating, in particular, how electrode pads 2 and thermic effect units 3 are formed in a VI-VI cross-section of FIG. 1A. The configurations and processes similar to the above are sometimes omitted.

Figure 6A:
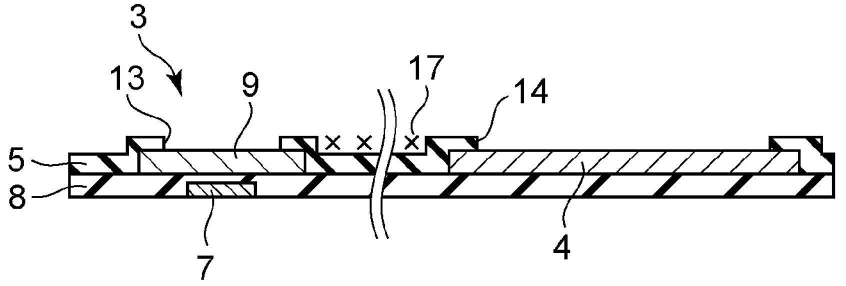
FIGS. 6A to 6E are schematic diagrams illustrating a method for producing a liquid-ejection head substrate according to a second embodiment.

As shown in FIG. 6A, first, a substrate serving as a first metal film constituting part of the electrode pads 2, in which wiring lines 4 and thermic effect units 3 are provided, is prepared. Referring to FIG. 6A, the cross-sectional configuration of the part constituting the electrode pads 2 will be described. An insulating protection layer 5 with electrical insulating properties is provided on the wiring lines 4 provided on an interlaminar film 8 on a base substrate (not shown). The insulating protection layer 5 has openings 14. The wiring lines 4 are made of noble metal such as iridium. Since the wiring lines 4 are made of noble metal, the oxide film as in the first embodiment is not formed on the surface of the wiring lines 4 of the insulating protection layer 5 exposed from the opening 14.

The configuration of the thermic effect units 3 is the same as that of the first embodiment. Forming the cavitation resistant films 9 and the wiring lines 4 with the same material in the same process will reduce the production load.

Figure 6B:
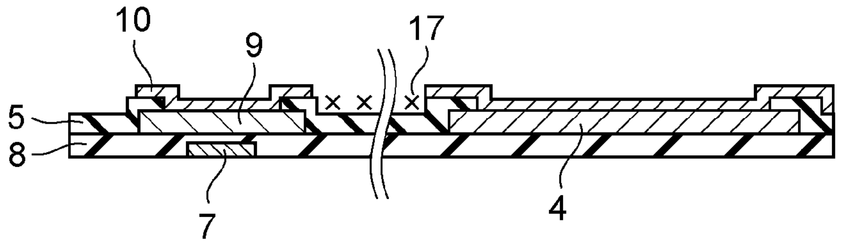

Referring next to FIG. 6B, a protective film 10 is formed so as to cover the top of the cavitation resistant film 9 of each thermic effect unit 3. The protective film 10 is also formed so as to cover the wiring line 4 exposed from the opening 14 of the insulating protection layer 5. The protective film 10 that covers the cavitation resistant film 9 is also referred to as a first protective film, and the protective film 10 that covers the wiring line 4 is also referred to as a second protective film. The plurality of protective films 10 (first protective films) are provided in independent patterns so as to cover the individual thermic effect units 3, as in the first embodiment. The liquid-ejection head substrate 1 is provided with multiple electrode pads 2, as shown in FIGS. 1A and 1B. Correspondingly, the insulating protection layer 5 is provided with a plurality of openings 14. The protective films 10 (second protective films) are provided in independent patterns so as to cover the individual surfaces of the wiring lines 4 exposed from the openings 14.

Not removing the protective film 10 provided at the portion of each electrode pad 2 in a later process allows the protective film 10 to be used as an adhesion-level enhancing film between the wiring line 4 and the insulating protection layer 5 and an electrode layer 12 described later. This allows for omitting the process of forming the diffusion prevention layer 11 on the electrode pad 2, as in the first embodiment. The protective films 10 may be made of the metallic material, such as titanium, tungsten, or titanium tungsten, described above, because of the resistance to sputter etching and the high adhesion to the wiring lines 4, the insulating protection layer 5, and the electrode layer 12.

Figure 6C:
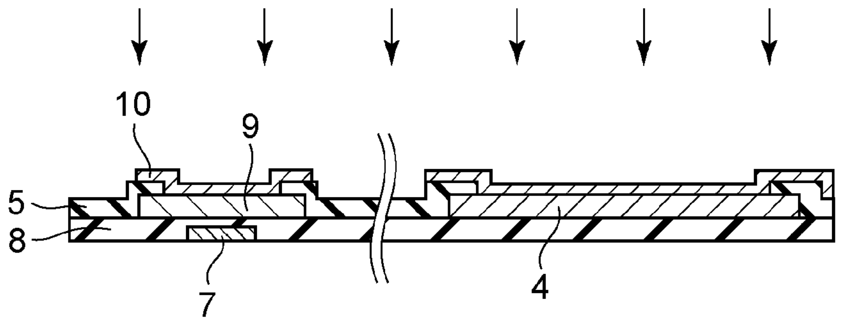

Referring next to FIG. 6C, the substrate is set in a deposition system and is subjected to a sputter etching (reverse sputtering) process to remove the altered substances 17 of the insulating protection layer 5. This exposes a clear surface of the substrate to provide high adhesion to the channel member. Since the cavitation resistant film 9 and the wiring line 4 are covered with the protective film 10, a decrease in the thickness due to the reverse sputtering process can be prevented. This can extend the life of the liquid ejection head 100.

Figure 6D:
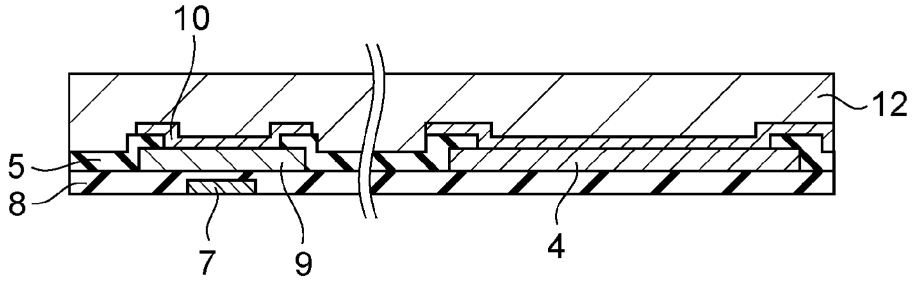

Referring next to FIG. 6D, the electrode layer 12, which is the second metallic film, is formed on the entire surface of the substrate with the deposition system next to the reverse sputtering process. Since the protective film 10 has high adhesion to the wiring line 4 and the electrode layer 12, as described above, the protective film 10 functions as an adhesion-level enhancing film between the wiring line 4 and part of the insulating protection layer 5 and the electrode layer 12 and has no problem in electrical conduction. The electrode layer 12 is made of gold, which has low specific resistivity and high corrosion resistance.

Figure 6E:
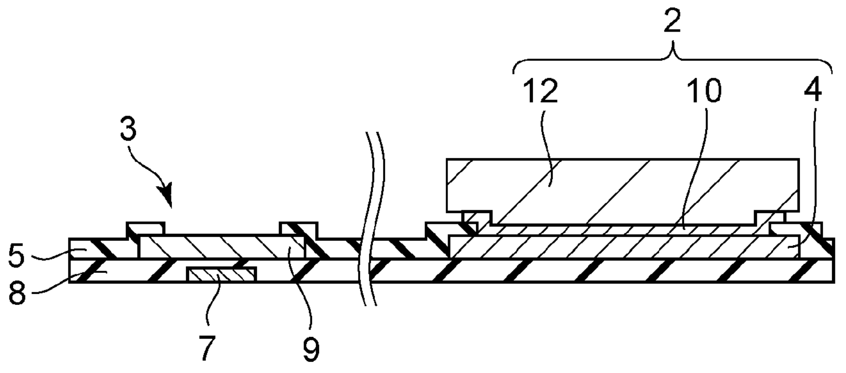

Referring next to FIG. 6E, the electrode layer 12 is patterned using a photolithography method to form the electrode pads 2. In this embodiment, each electrode pad 2 is a lamination of the wiring line 4, the second protective film, and the electrode layer 12. Next, the protective film 10 of the thermic effect unit 3 is etched. At that time, part of the protective film 10 disposed on the electrode pad 2 is also etched so that the protective film 10 is left only under the electrode layer 12.

Example 1

The above embodiments will be described more specifically with reference to examples.

In EXAMPLE 1, the liquid-ejection head substrate 1 shown in FIGS. 1A and 1B was formed using the production method shown in FIGS. 2A to 2E. In EXAMPLE 1, the wiring lines 4 were made of aluminum, the insulating protection layer 5 was made of silicon carbonitride, and the cavitation resistant film 9 was made of iridium in FIG. 2A. An altered layer was formed in the surface layer of the insulating protection layer 5, and a small amount of organic pollutants were attached to the surface layer.

Referring next to FIG. 2B, the protective film 10 was formed so as to cover only the top of the cavitation resistant film 9 of each thermic effect unit 3. The protective film 10 was made of titanium tungsten with a thickness of 50 nm in the viewpoint of preventing the generation of a fence and the performance of coating the cavitation resistant film 9. The titanium tungsten exhibited high resistance to sputter etching and high adhesion to the cavitation resistant film 9 and the insulating protection layer 5.

Referring next to FIG. 2C, the substrate was set to a deposition system and was subjected to a sputter etching (reverse sputtering) process to remove the oxide film 6 formed on the wiring line 4. The sputter etching was performed under the conditions of a flow rate of argon gas of 30 sccm, a power of 400 W, and a processing time of 20 seconds. Thus, the altered layer and the organic pollutants on the surface of the insulating protection layer 5 were removed. Since the protective film 10 was provided on the top of the cavitation resistant film 9, the cavitation resistant film 9 was not decreased in thickness by the reverse sputtering. In contrast, the insulating protection layer 5 in the area where the protective film 10 is not disposed decreased by a thickness of more than 10 nm.

Referring next to FIG. 2D, the diffusion prevention layer 11 and the electrode layer 12 were formed on the entire surface of the substrate by the deposition system, subsequent to the reverse sputtering process. The diffusion prevention layer 11 was formed of titanium tungsten with a thickness of 200 nm, which is a metallic material that has high adhesion to the wiring line 4 and the electrode layer 12, stability to temperature to cause no diffusion, and low specific resistivity. The electrode layer 12 was made of gold, which has low specific resistively and high corrosion resistance, in a thickness of 400 nm.

Referring next to FIG. 2E, the electrode layer 12 and the diffusion prevention layer 11 were patterned using a photolithography method to form the electrode pads 2. Thereafter, unnecessary part of the electrode layer 12 and the diffusion prevention layer 11 were etched by wet etching. Since the diffusion prevention layer 11 and the protective film 10 were made of the same material, the diffusion prevention layer 11 and the protective film 10 could be removed by the same etching method. The electrode layer 12 made of gold was etched for a desired time using an etchant containing iodine and potassium iodide. The diffusion prevention layer 11 and the protective film 10 made of titanium tungsten were etched using a 30% hydrogen peroxide solution. Employing wet etching with a hydrogen peroxide solution for etching the protective film 10 provides sufficient options for the cavitation resistant film 9, allowing for preventing a decrease in the thickness of the cavitation resistant film 9. The protective film 10 was formed in a small thickness of 50 nm, and the level difference due to the decrease in the thickness of the insulating protection layer 5 caused by the reverse sputtering was as small as a dozen nm. For this reason, the result of observation of the portion of the protective film 10 after the protective film 10 was etched showed that no fence was formed.

Example 2

In EXAMPLE 2, the liquid-ejection head substrate 1 shown in FIGS. 1A and 1B was formed using the production method shown in FIGS. 6A to 6E. In EXAMPLE 2, the wiring lines 4 were made of iridium, the insulating protection layer 5 was made of silicon carbonitride, and the cavitation resistant film 9 was made of iridium in FIG. 6A. No oxide film was formed on part of the wiring line 4 exposed from the opening 14 of the insulating protection layer 5 because the wiring line 4 was made of noble metal. An altered layer was formed in the surface layer of the insulating protection layer 5, and a small amount of organic pollutants were attached to the surface layer.

Referring next to FIG. 6B, the protective films 10 were formed so as to cover the top of the cavitation resistant film 9 of each thermic effect unit 3 and the portion of the wiring line exposed from the opening 14. The protective film 10 was made of titanium tungsten with a thickness of 50 nm in the viewpoint of preventing the generation of a fence and the performance of coating the cavitation resistant film 9.

Referring next to FIG. 6C, the substrate was set in a deposition system and is subjected to a sputter etching (reverse sputtering) process to remove the altered surface layer of the insulating protection layer 5. The sputter etching was performed under the conditions of a flow rate of argon gas of 30 sccm, a power of 400 W, and a processing time of 20 seconds. This exposed a clear surface of the substrate to provide high adhesion to the channel member. Since the protective film 10 was provided on the top of the cavitation resistant film 9, the cavitation resistant film 9 was not decreased in thickness by the reverse sputtering.

In contrast, the insulating protection layer 5 at the area where the protective film 10 is not disposed decreased by a thickness of more than 10 nm.

Referring next to FIG. 6D, the electrode layer 12 was formed on the entire surface of the substrate by the deposition system, subsequent to the reverse sputtering process. The electrode layer 12 was formed with gold in a thickness of 400 nm.

Referring next to FIG. 6E, the electrode layer 12 was patterned using a photolithography method to form the electrode pads 2. The electrode layer 12 made of gold was etched for a desired time using an etchant containing iodine and potassium iodide.

Next, the protective film 10 of the thermic effect unit 3 was etched. The protective film 10 made of titanium tungsten was etched for a desired time using a 30% hydrogen peroxide solution. At the same time, part of the protective film 10 disposed on the electrode pad 2 was also etched to leave the protective film 10 only under the electrode layer 12. Employing wet etching with a hydrogen peroxide solution for etching the protective film 10 provides sufficient options for the cavitation resistant film 9, allowing for preventing a decrease in the thickness of the cavitation resistant film 9. The protective film 10 was formed in a small thickness of 50 nm, and the level difference due to the decrease in the thickness of the insulating protection layer 5 caused by the reverse sputtering was as small as a dozen nm. For this reason, the result of observation of the portion of the protective film 10 after the protective film 10 was etched showed that no fence was formed.

The embodiments of the present disclosure allow reducing or eliminating a decrease in the thickness of the cavitation resistant film of the liquid-ejection head substrate.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-047215, filed Mar. 22, 2021, which is hereby incorporated by reference herein in its entirety.

What is claimed is:

1. A method for producing a liquid-ejection head substrate, the method comprising:

preparing a substrate including a heating resistor and a cavitation resistant film including a portion provided at a position where the heating resistor is covered, a surface of the portion being exposed to an outside;

forming a protective film covering the surface of the portion of the cavitation resistant film with a metallic material containing at least one of titanium, tungsten, and titanium-tungsten;

etching the substrate after forming the protective film; and removing the protective film after the etching.

2. The method for producing a liquid-ejection head substrate according to claim 1, wherein, in the preparing of the substrate, the substrate further including an insulating protection layer having a surface adjacent to the surface of the portion of the cavitation resistant film, the surface being exposed to the outside, is prepared, and wherein, in the etching, an altered substance on the surface of the insulating protection layer is removed.

3. The method for producing a liquid-ejection head substrate according to claim 1, wherein the etching includes sputter etching.

4. The method for producing a liquid-ejection head substrate according to claim 1, wherein the protective film has a thickness of 60 nm or less.

5. The liquid-ejection head substrate according to claim 1, wherein the protective film has a thickness of 20 nm or more.

6. The method for producing a liquid-ejection head substrate according to claim 1, wherein the cavitation resistant film contains at least one selected from the group consisting of tantalum, niobium, iridium, and ruthenium.

7. The method for producing a liquid-ejection head substrate according to claim 1, wherein, in the preparing of the substrate, the substrate further including a first metal film having a surface exposed to the outside, the first metal film serving as part of an electrode pad, is prepared, and wherein, in the forming of the protective film, the protective film that covers the surface of the portion of the cavitation resistant film is formed as a first protective film; and a second protective film that covers the surface of the first metal film with a same material as a material of the first protective film, the second protective film serving as part of the electrode pad, is formed.

8. The method for producing a liquid-ejection head substrate according to claim 7, the method further comprising:

providing a second metallic film serving as part of the electrode pad on a surface of the second protective film after forming the protective film and before removing the protective film, wherein, in the removing of the protective film, the protective film is removed by removing the first protective film so as to expose the surface of the portion of the cavitation resistant film in such a manner that the second protective film is interposed between the first metal film and the second metallic film.

9. The method for producing a liquid-ejection head substrate according to claim 7, wherein, in the preparing of the substrate, the substrate including the cavitation resistant film and the first metal film made of a same material in a same layer is prepared.

10. The method for producing a liquid-ejection head substrate according to claim 7, wherein the cavitation resistant film and the first metal film contain at least one of iridium and ruthenium.

11. The method for producing a liquid-ejection head substrate according to claim 1, wherein, in the preparing of the substrate, the substrate further including a first metal film serving as part of an electrode pad and an oxide film formed on a surface of the first metal film is prepared, and wherein, in the etching, the oxide film is removed.

12. The method for producing a liquid-ejection head substrate according to claim 11, the method further comprising:

forming an intermediate metallic film containing the same material as the material of the protective film and covering a surface of the protective film and the surface of the first metal film; and removing the intermediate metallic film covering the protective film, with part of the intermediate metallic film left, the part covering the surface of the first metal film serving part of the electrode pad, wherein the intermediate metallic film and the protective film are removed in a same process.

13. The method for producing a liquid-ejection head substrate according to claim 1, wherein, in the preparing of the substrate, the substrate including a plurality of the heating resistors is prepared, and wherein, in the forming of the protective film, the protective film covering each of the plurality of heating resistors is formed.

* * * * *